US006973581B2

(12) United States Patent
Chung et al.

(10) Patent No.: US 6,973,581 B2
(45) Date of Patent: Dec. 6, 2005

(54) PACKET-BASED INTERNET VOTING TRANSACTIONS WITH BIOMETRIC AUTHENTICATION

(75) Inventors: Kevin Kwong-Tai Chung, Princeton, NJ (US); James Arthur Minadeo, Lebanon, NJ (US); Xiaoming Shi, Highland Park, NJ (US)

(73) Assignee: Amerasia International Technology, Inc., Princeton Junction, NJ (US)

( * ) Notice: Subject to any disclaimer, the term of this patent is extended or adjusted under 35 U.S.C. 154(b) by 0 days.

(21) Appl. No.: 10/348,433

(22) Filed: Jan. 21, 2003

(65) Prior Publication Data

US 2003/0136835 A1   Jul. 24, 2003

Related U.S. Application Data

(60) Provisional application No. 60/351,266, filed on Jan. 23, 2002, provisional application No. 60/352,901, filed on Jan. 30, 2002, provisional application No. 60/359,558, filed on Feb. 22, 2002, provisional application No. 60/377,824, filed on May 3, 2002, provisional application No. 60/382,033, filed on May 20, 2002, provisional application No. 60/385,118, filed on May 30, 2002.

(51) Int. Cl.[7] ........................ G06F 11/30; G06F 12/14; G06F 17/60; H04L 9/00; H04L 9/32

(52) U.S. Cl. ........................ 713/202; 713/201; 705/12

(58) Field of Search ........................ 705/12; 713/202, 713/201

(56) References Cited

U.S. PATENT DOCUMENTS

| | | | |
|---|---|---|---|
| 4,373,134 A | 2/1983 | Grace | |
| 5,612,871 A | 3/1997 | Skogmo | |
| 6,079,621 A * | 6/2000 | Vardanyan et al. | 235/487 |
| 6,081,793 A | 6/2000 | Challener et al. | |
| 6,250,548 B1 | 6/2001 | McClure et al. | |
| 6,412,692 B1 | 7/2002 | Miyagawa | |
| 2001/0034640 A1 * | 10/2001 | Chaum | 705/12 |
| 2002/0019767 A1 * | 2/2002 | Babbitt et al. | 705/12 |
| 2002/0074399 A1 | 6/2002 | Hall et al. | |
| 2002/0078358 A1 | 6/2002 | Neff et al. | |
| 2002/0133396 A1 | 9/2002 | Barnhart | |

OTHER PUBLICATIONS

Hart Interactive, "eSlate Electronic Voting System," http://www.worldwideelection.com/GoveSlate.cfm, 1998-2000, 2 pages.

VoteHere.net, http://votehere.net/VH-Content-v2.0/platinuminfo.html, 1999-2000, 1 Page.

WEBVOTE Inc., "Electronic and Internet Voting," http://webvote-inc.com, 1999, Printed Dec. 19, 2002, 1 Page.

(Continued)

*Primary Examiner*—Gilberto Barron, Jr.
*Assistant Examiner*—Benjamin E. Lanier
(74) *Attorney, Agent, or Firm*—Dann, Dorfman, Herrell & Skillman, P.C.

(57) ABSTRACT

Internet voting or other Internet transaction comprises transmitting three information packets via the Internet. At least one information packet includes an identifier that is authenticated, such as a key, a biometric digitized signature or other biometric identifier. Where an information packet may include transaction information in a predetermined form, information packets including information in another form may be processed separately.

57 Claims, 6 Drawing Sheets

OTHER PUBLICATIONS

WEBVOTE Inc., "WebVote's Internet Trial," http://www.webvote-inc.com/demo.htm, 1999, Printed Dec. 19, 2002, 1 Page.

WEBVOTE Inc., "WebVote Internet Voting Software," http://www.webvote-inc.com/internet.htm, 1999, Printed Dec. 19, 2002, 1 Page.

WEBVOTE Inc., "Laptop Software for the New Generation of Voting," http://www.webvote-inc.com/laptop.htm, 1999, 2 Pages.

Alan Dechert, "The Voter Certified Ballot," Granite Bay, CA., http://www.go2zero.com/voterform.html, Feb. 13, 2001, 15 Pages.

Rebecca Mercuri, "A Better Ballot Box?", IEEE Spectrum, Oct. 2002, pp. 46-50.

Peter Neumann, "Internet and Electronic Voting," *The Risks Digest*, vol. 21, Issue 14, http://www.notablesoftware.com/Papers/Risks2114.html, Dec. 12, 2000, 3 Pages.

Rebecca Mercuri, "Rebecca Mercuri's Statement on Electronic Voting," http://www.notablesoftware.com/RMstatement.html, Copyright c 2001, 2 Pages.

A. Riera, J. Borrell, J. Rifa, "An uncoercible verifiable electronic voting protocol," Proceedings of IFIP SEC '98, Online, Sep. 4, 1998, pp. 206-215, XP002272039, Austria.

Benaloh J et al, "Receipt-Free Secret-Ballot Elections (Extended Abstract)," Proceedings of the Annual ACM Symposium on the Theory of Computing, XX, XX, 1994, pp. 544-553, XP002099996.

Jinn-Ke Jan et al, "A Secure Electronic Voting Protocol With IC Cards," Security Technology, 1995. Proceedings, Institute of Electrical and Electronics Engineers 29th Annual 1995 International Carnahan Conference on Sanderstead, UK Oct. 18-20, 1995, New York, NY USA, Oct. 18, 1995, pp. 259-265, XP010196424.

\* cited by examiner

PACKET-BASED INTERNET VOTING TRANSACTIONS WITH BIOMETRIC AUTHENTICATION

This Application claims the benefit of:

U.S. Provisional Application Ser. No. 60/351,266 filed Jan. 23, 2002,

U.S. Provisional Application Ser. No. 60/352,901 filed Jan. 30, 2002,

U.S. Provisional Application Ser. No. 60/359,558 filed Feb. 22, 2002,

U.S. Provisional Application Ser. No. 60/377,824 filed May 3, 2002,

U.S. Provisional Application Ser. No. 60/382,033 filed May 20, 2002, and

U.S. Provisional Application Ser. No. 60/385,118 filed May 30, 2002.

The present invention relates to Internet transactions and, in particular, to transactions conducted via the Internet with authentication. Such transactions may include, but are not limited to, voting, other government transactions (e.g., e-government), and/or private and/or commercial transactions (e.g., e-commerce). Authentication may include biometric authentication.

Many problems have been experienced with conventional voting apparatus, whether paper ballot, punch-card ballot, optical scan ballot, lever or other mechanical machine and electronic voting machines, as reported in the popular media and in specialized media. When these problems are coupled with the problems of access to voting because of handicap or disability, poor physical facilities at a polling place, geographical location outside of the election jurisdiction during an election, military service, travel, relative short and limited times for voting, and the like, a desire arises for a voting system that would allow people to vote without having to go to a polling place on an election day.

Recent approaches to reducing the impact of such problems have included voting-by-mail in Oregon, USA, and "early" voting, such as that conducted in shopping malls and the like for the November 2002 election in Sacramento County, Calif. Of these, voting by mail comes with all of the problems associated with the paper ballots utilized plus the problems of delayed delivery and possible vote fraud when the ballots are away from the control of the local election office (LEO). Early voting, while burdensome for LEO personnel, logistically inconvenient with moving and setting up voting equipment, and technically challenging for the equipment utilized, is feasible and has been successfully conducted. The successful early voting in the November 2002 election in Sacramento County, Calif., utilized the VOTE TRAKKER™ voting system available from Avante International Technology, Inc. located in Princeton, Junction, N.J., whose web site address is www.vote-trakker.com.

Another solution proposed is voting over the Internet (VOI) which would allow people to vote from their own computers, in their homes, offices and other convenient places, without regard to their geographical location and without having to limit voting to a relatively short period of time, such as to one day or a part thereof.

The prospect of Internet voting raises another set of potential problems regarding security, identification, authentication, viruses, Trojan horses, hacking, attack, and the like. Concerns regarding Internet voting are described, for example, in R. Mercuri, "A Better Ballot Box?", *IEEE Spectrum,* October 2002, pages 46–50, in P. Neumann et al, "Internet and Electronic Voting," *The Risks Digest,* Volume 21, Issue 14, 12 December 2000, in B. Schneier, "Voting and Technology," *Crypto-Gram,* Dec. 15, 2000, in R. Mercuri, "Rebecca Mercuri's Statement on Electronic Voting," http://www.notablesoftware.com/RMstatement.html, and in R. Mercuri, "Electronic Voting," http://www.notablesoftware.com/evote.html.

While the many problems are raised and discussed, apparently no satisfactory solution has come to the attention of those writing about the problems. Of these, two important problems are that of authenticating the identity of a voter who is not present at a polling place or otherwise not before an election official, of accuracy/security that the vote is not changed or otherwise tampered with, and of "transparency" in providing the ability to verify that the vote case by a voter has been properly recorded and counted without compromising the anonymity and privacy of the voter.

Accordingly, there is a need for a method and system for conducting Internet transactions, in particular, Internet voting transactions, that is more robust in addressing one or more of the foregoing problems.

To this end, the method of the present invention for conducting a transaction via the Internet comprises:

transmitting via the Internet a first information packet;

authenticating the first information packet;

if the first information packet is authenticated, transmitting a second information packet via the Internet, the second information packet including machine readable instructions for enabling transaction information to be entered and transmitted in a predetermined format in a third information packet;

transmitting via the Internet the third information packet including transaction information entered therein;

validating the third information packet as relating to the second information packet;

if the third information packet is validated, testing the third information packet for transaction information in the predetermined format; and if the transaction information is in the predetermined format, processing the transaction information of the third information packet that is in the predetermined format for conducting a transaction.

According to other aspects of the invention, selection information may include a selection from among predetermined selections and/or a write-in selection, and/or the write-in information may be limited by number and type of characters.

According to another aspect, identifying and/or authenticating information may include one or more of a symmetric key, an asymmetric key, a public key, a private key, a biometric identifier, and/or a biometric digitized signature.

According to a further aspect, the invention may include a storage medium encoded with machine-readable computer instructions for conducting a transaction via the Internet.

BRIEF DESCRIPTION OF THE DRAWING

The detailed description of the preferred embodiments of the present invention will be more easily and better understood when read in conjunction with the FIGURES of the Drawing which include.

Figure 1:
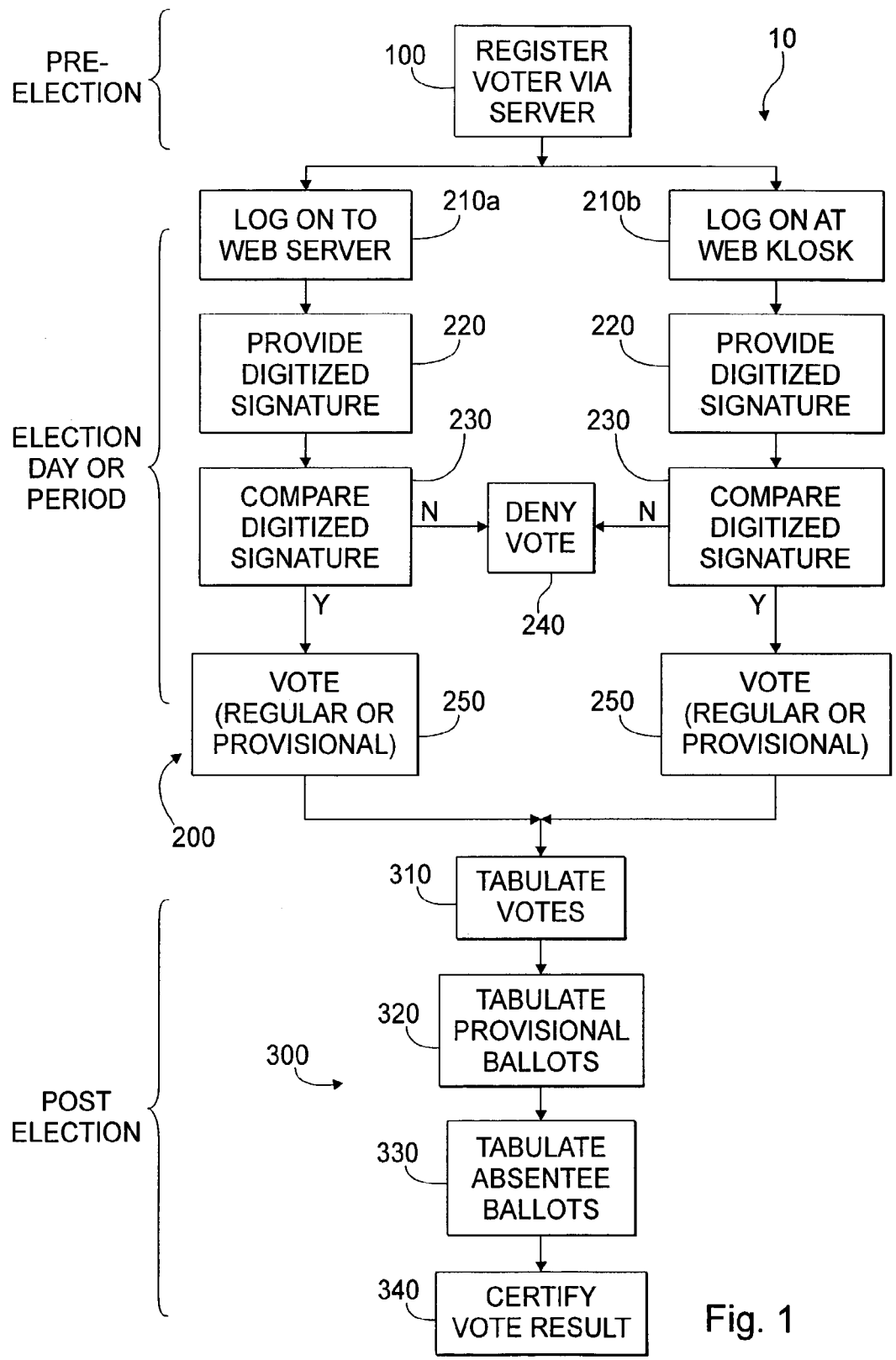
FIG. 1 is a schematic diagram representative of an example election process.

In the Drawing, where an element or feature is shown in more than one drawing figure, the same alphanumeric designation may be used to designate such element or feature in each figure, and where a closely related or modified element is shown in a figure, the same alphanumerical designation primed or designated "a" or "b" or the like may be used to designate the modified element or feature. Similarly, similar elements or features may be designated by like alphanumeric designations in different figures of the Drawing and with similar nomenclature in the specification. It is noted that, according to common practice, the various features of the drawing are not to scale, and the dimensions of the various features are arbitrarily expanded or reduced for clarity.

DESCRIPTION OF THE PREFERRED EMBODIMENT

FIG. 1 is a schematic flow diagram representative of an example election process 10. Prior to an election, i.e. pre-election, voters are registered 100 to vote via a server, for example, a web server communicating via the Internet. Conducting registration 100 may include utilization of a digital signature certificate issued by an appropriate agency or person, and includes a biometric digitized signature captured in a suitable manner. A biometric signature is a digitized signature that includes the unique dynamic characteristics of the signer signing the signature, which can only be reproduced by the person signing the signature, as opposed to an image, picture or other graphical representation of a signed signature of which an electronically and/or optically reproduced or copied reproduction is easily done electronically and is indistinguishable from the original. A biometric digitized signature, which may also be referred to as a dynamic signature, provides the capability to authenticate the identity of a person (voter) electronically when the person is not present, e.g., at a polling place or election office before an election official.

A preferred biometric digitized signature is described in U.S. patent application Ser. No. 10/127,793 entitled "GENERATION AND VERIFICATION OF A DIGITIZED SIGNATURE" filed Apr. 22, 2002 by Kevin Kwong-Tai Chung et al, which application is hereby incorporated herein by reference in its entirety. It is noted that any biometric digitized signature or other biometric characteristic, such as a fingerprint, palm print, eye and/or iris scan, facial scan and the like, that reliably identifies an individual, may be suitable, however, social and/or cultural factors may tend to make certain people and/or people groups averse to certain biometric identifiers.

It is noted that PKI technology may be implemented in two prevalent ways—either by a registered PKI key or digital certificate on and/or linked to certain equipment or by a PKI smart card. In the case of the equipment-linked PKI which operates on the equipment serial number or other equipment identifier and a personal user key, anyone gaining access to the equipment can conduct a transaction using the equipment. In the case of a PKI certificate associated with a smart card in which is coded the necessary PKI information, anyone gaining access to the card and having the ability to utilize same may conduct a transaction. Thus, PKI encryption alone, which cannot authenticate the identity of the remote user (voter), is not considered adequate for providing the degree of authentication and security desired for a voting transaction.

On the other hand, a unique biometric identifier is not subject to the inability to authenticate the user inherent in present public key infrastructure (PKI) digital signature technology and digital image signature technology, and so can replace the requirement for a written (ink) signature of a voter, and possibly of a witness, as is required by the present election law of certain jurisdictions, e.g., for registration, voting and/or absentee voting. Biometric digitized signature authentication and/or other biometric authentication as described may be utilized alone or in combination with a PKI certificate, a PKI common access card and/or other access/identification card, and/or other security features.

During an election, during the day or other period for voting, voting is conducted 200 via the Internet and/or via other communication with a server. For Internet voting, a voter logs on 210a to a web server via the Internet and/or other means for communicating. Once logged on 210a, a digitized signature, preferably a biometric digitized signature, is provided 220 and is now referred to as a transaction digitized signature. The transaction digitized signature is compared 230 to a reference digitized signature previously acquired, e.g., a biometric digitized signature acquired in one or more previous transactions, such as in registering 100 to vote and/or in voting in a previous election, that is stored in a registration and/or voter database on the web server and/or on another server and/or computer.

If comparison 230 of the transaction and reference digitized signatures produces an indication "Y" of a match, then the voter is deemed to be authenticated and voting is authorized. The voter then votes 250 by whatever form of ballot (e.g., regular, absentee or provisional) is appropriate. If comparison 230 of the transaction and reference digitized signatures does not produce an indication "N" of a match, there is no match and the voter is deemed to not be authenticated and is denied to vote 240. If there is any question as to whether the digitized signatures match and/or as to eligibility to vote, an "Y" indication may be provided and provisional voting 250 may be authorized.

It is noted that the identifying and/or authenticating information may include one or more of a symmetric key, an asymmetric key, a public key, a private key, a biometric identifier, and/or a biometric digitized signature, or other suitable unique identifier.

For voting at a polling place or at voting apparatus at another location, a voter logs on 210b at a vote kiosk or other voting apparatus. The vote kiosk or other voting apparatus includes a computer therein and/or is in communication with a computer via the Internet and/or other means for communicating, and may be and/or include a direct recording electronic (DRE) voting machine as described herein. A suitable voting machine/kiosk arrangement is described in U.S. patent application Ser. No. 10/255,348 entitled "ELECTRONIC VOTING APPARATUS, SYSTEM AND METHOD" filed Sep. 26, 2002, by Kevin Kwong-Tai Chung, which application is hereby incorporated herein by reference in its entirety.

Once logged on 210b at a voting machine and/or kiosk, a digitized signature, preferably a biometric digitized signature, is provided 220 and is compared 230 to a reference digitized signature previously acquired, e.g., as described above. If comparison 230 of the transaction and reference digitized signatures produces an indication "Y" of a match, then the voter is deemed to be authenticated and voting is authorized. The voter then votes 250 by whatever form of ballot is appropriate. If comparison 230 of the transaction and reference digitized signatures does not produce an indication "N" of a match, there is no match and the voter is deemed to not be authenticated and is denied to vote 240. Provisional voting 250 may be authorized where there is a question of matching of the digitized signatures match and/or eligibility to vote.

When the period for voting has ended, i.e. in a post-election period, the votes are tabulated 300 and the results of the voting is certified 340 as the official outcome of the election. Although vote tabulating 300 may be performed in any order, it is usually preferred that a particular order and process be followed for better security. In particular, votes cast in the regular manner (i.e. not having any write-in votes and/or not cast provisionally or by an absentee voter) are typically counted and tabulated first, e.g., because these are in a prescribed standardized form that can be counted quickly and automatically without intervention by voting officials, and also typically because these are the majority of the votes cast and often, but not always, point to the final outcome.

Provisional and absentee ballots are also counted and tabulated 320, 330. Because provisional and absentee ballots require action on the part of an election authority to determine the eligibility of the voter to vote and/or to authenticate the ballot prior to the ballot being counted, counting and tabulating 320, 330 of these votes is typically follows counting and tabulating 310 of the regularly cast ballots. When all of the votes/ballots have been counted and the result tabulated/tallied, then the election result is certified 340 in accordance with applicable legal requirements.

Voting as used herein refers to any and/or all of the ways in which a vote may be cast, whether by regular, provisional, absentee and/or any other form of ballot. An election as used herein refers to any time period, whether a day or part thereof or other time period, in which a vote may be cast, and may include where a different time period may be permitted for voting certain forms of ballots, e.g., absentee ballots.

Voting transactions as used herein refers to any and/or all actions taken by a person registering to vote and/or to vote whether using a regular, provisional, absentee and/or other form of voting and/or election, and also includes any and/or all actions taken by election authorities and/or other personnel in relation to registering a person to vote, to conducting voting whether by a regular, provisional, absentee and/or other form of voting, and/or to receiving, collecting, authenticating, counting, tabulating and/or otherwise processing votes and/or to conducting, controlling and/or managing an election.

Figure 2:
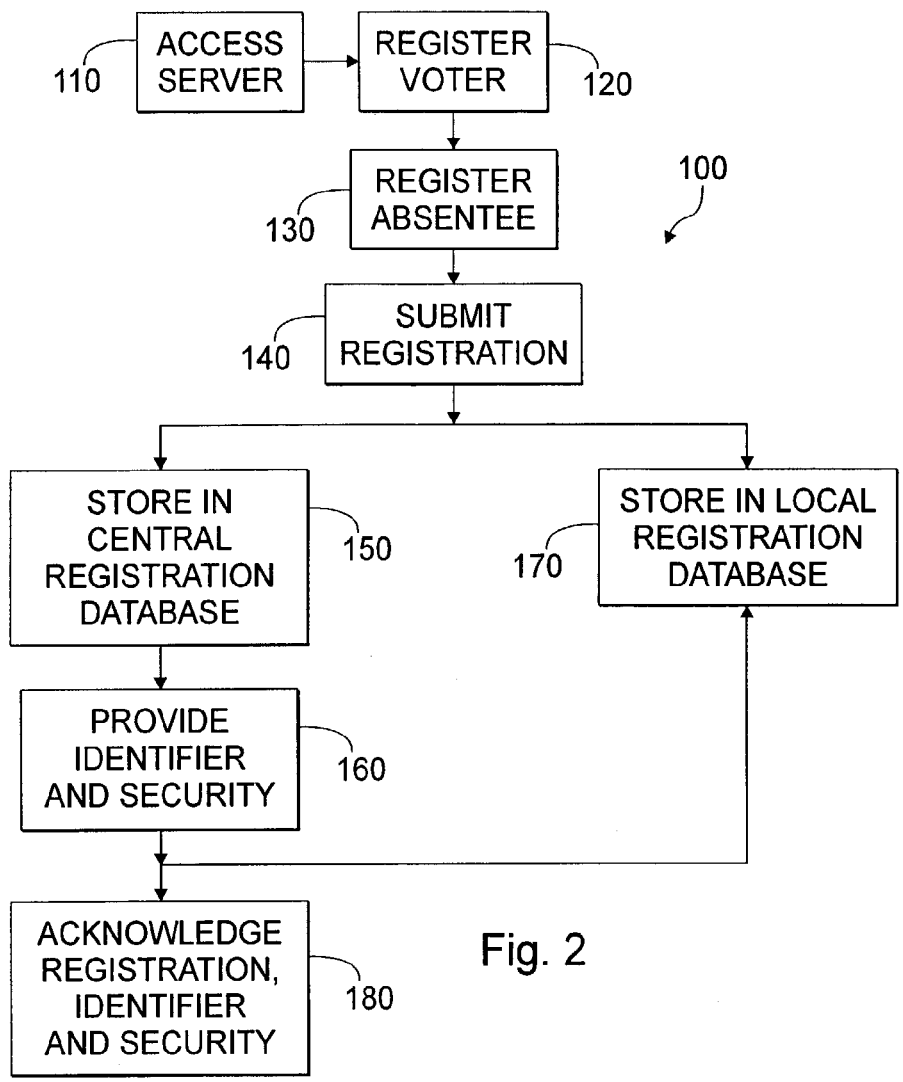
FIG. 2 is a schematic diagram of a portion of the example election process of FIG. 1.

FIG. 2 is a schematic flow diagram of a portion 100 of the example election process 10 of FIG. 1. Registration 100 includes accessing 110 a server and/or logging on to a server, e.g., via the Internet or other communication means, for registering 120 a voter to vote, i.e. establishing a person on a database accessed via the server wherein is stored registration information concerning persons who are registered and/or eligible to vote and/or conduct a voting or other transaction. Registration 100 includes initial registration 120 and/or registration 130 for absentee voting. Registering 130 for absentee voting may be included in an initial voting registration 120 and/or may be a separate transaction for persons who have previously registered 120 for voting.

Registration 120, 130 includes entering voter and/or voting (election) registration information via the computer and server, and then submitting 140 the entered registration information via the server and communication means. Registration formats may be in like format to federal registration forms, e.g., the federal post card application (FPCA), the electronic federal post card application (EFPCA), and/or to state and/or local format requirements, and may also include enlarged fonts, enlarged display and/or voice assistance, for visually-impaired persons. In addition, the electronic registration forms provided may include look-up tables, hyperlinks and or other means for allowing the person to access information that may be necessary and/or helpful in registering and/or voting (e.g., election laws, address-to-voting district correlations) and/or for automatically checking information provided by the person for consistency (e.g., motor vehicle records, voting registration records for other jurisdictions, health department death records), with or without access by the person registering.

Submitting 140 registration information includes electronically submitting same to the server, however, where the election law requires a paper application and/or written (ink) signature, the registration application may also be printed for signature by the person registering and physical submission (e.g., by mail or courier) to the appropriate election office. Preferably, visual and/or aural prompts are provided, e.g., at the initiation of the submission 140, to urge the person to provide all required information, e.g., by reminder to enter missing information. The completed registration is signed by the person using a biometric digitized signature, a biometric identifier, a PKI digital signature and/or other identifier, prior to submission 140. Registration by paper application is not precluded by the electronic registration arrangement described herein.

Submitted 140 registration information may be stored 150 in a central registration database and/or may be stored 170 in a local registration database. In addition to name, address, date of birth and other voter identifying information, the biometric digitized signature and/or other biometric identifying information is stored in the registration database. Entry of the information provided by the person registering may be entered 150, 170 into the database automatically directly from the electronic registration application, may be entered manually by election personnel, and/or may be entered automatically subject to confirmation and approval by election personnel. Such confirmation and approval may include verification against and/or comparison with other government or non-government records, e.g., motor vehicle registrations, driver's license records, a previously provided digitized signature and/or biometric digitized signature, and/or another biometric identifier.

In view of recent legislation in the United States, centralized state voter registration databases are expected to become typical, with local (e.g., county, municipal, etc.) election offices utilizing the state database or a database derived from information in the state database. Thus, registration information is typically stored 150 in a state database and is distributed for being stored 170 in a county, municipal and/or other local database. However, the central registration database could be a national or federal database and the local registration database could be a state, provincial, municipal and or other local database, depending upon the governmental structure, election organization and applicable law.

Typically, registration identifying information and security information is provided 160 and associated with a registration by the primarily responsible election office, be that stored 150 in the central database and/or stored 170 in the local database. Identifying and/or security information may include a voter identifier (also known as a "VID" number), a PKI certificate, a PKI key, and the like. Preferably, the VID number is of a sort including voting jurisdiction information and a unique randomized identifier, e.g., as described in incorporated U.S. patent application Ser. No. 10/255,348.

Registration when processed and approved is acknowledged 180 to the person registering by providing one or more of a PKI certificate, a PKI key, a VID number, and the like, and/or an optional voter identification card by mail. Preferably, because the processing of a registration application may take time to verify the person's identity and/or other information, the person registering may be quickly (e.g., within minutes) provided an application tracking number and a receipt that can be printed out. The printed receipt may be a copy of the electronic application as submitted. Until the registration is approved, the status thereof in processing may be made available via the election office web site, e.g., in response to entering the application tracking number and other identifying information.

Preferably, communication 140 of each registration application and each acknowledgment 180 is transmitted via the Internet and/or other communication means, with a packetized communication, encryption, and/or date-time stamp, as described herein.

A suitable voter registration arrangement is described in U.S. patent application Ser. No. 10/208,926 entitled "REGISTRATION APPARATUS AND METHOD, AS FOR VOTING" filed Jul. 30, 2002, by Kevin Kwong-Tai Chung, which application is hereby incorporated herein by reference in its entirety.

Figure 3:
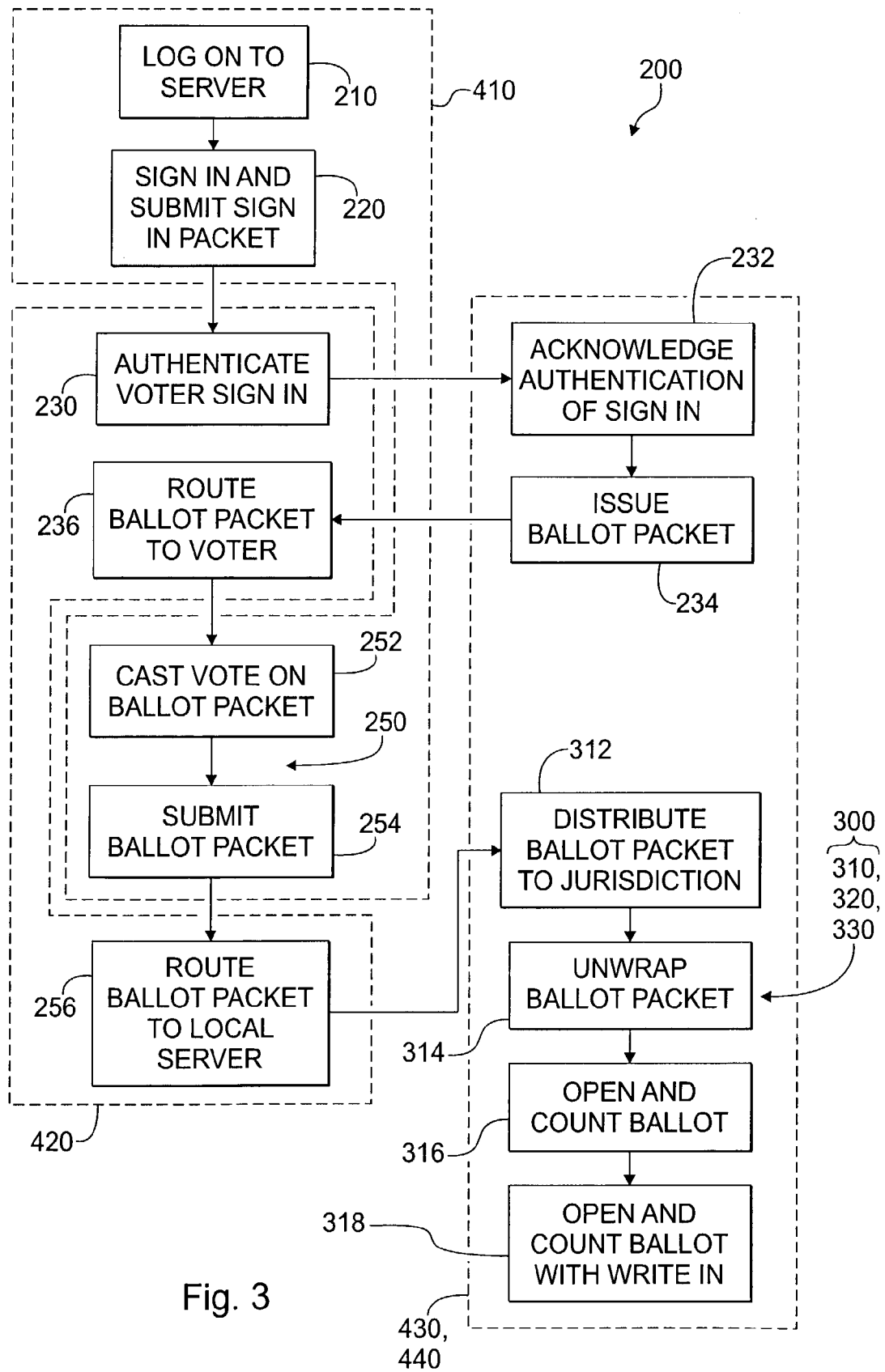
FIG. 3 is a schematic diagram of another portion of the example election process of FIG. 1.

FIG. 3 is a schematic flow diagram of another portion of the example election process 10 of FIG. 1. Specifically, an arrangement is described wherein Internet communication between a person registering and/or voting and the server is minimized, thereby to reduce the opportunities for an intruder and/or hacker to change and/or interfere with information transmitted over the Internet. To this end, interactive communication between the person registering/voter and the election server is preferably avoided and communication by sending a limited number of information packets, each having a predetermined format, is utilized. In addition, and optionally, each information packet may be encrypted for communication, such as by PKI encryption, security socket layer (SSL) which prevents the content of the transmission from being read, MD5 128-bit encryption which provides security for the integrity of the content of the transmission, and/or any other suitable encryption means.

Accordingly, registration need only include the sending of a registration packet via the Internet to the person registering and that person returning the completed registration packet to the registration server. Similarly, voting need only include the sending of a ballot packet via the Internet to the person voting and that person returning the completed (i.e. voted) ballot packet to the voting server. For improved security, registration packets and ballot packets preferably are opened one at a time according to a certain protocol. Such packetized communication and data processing is described in relation to a voting transaction, e.g., voting, however, the communication and data processing for registration and other transactions is similar. In FIG. 3, operations typically performed by a voter's computer are arranged in dashed area 410 and those performed on a server are arranged in dashed areas 420, 430, 440.

A voting transaction 200 is initiated by a voter signing on 210 to the server and submitting 220 a sign-in packet including providing a biometric digitized signature (e.g., including accessing the server and logging on) therewith for initiating voting. Sign-in information may also include a VID number, a PKI key or certificate, and/or other identifying information, in addition to a biometric identifier. Logging on 210 and submitting 220 are performed on a user device 410, such as the voter's computer, personal computer, pocket PC, PDA device and the like, including a digitized signature capturing device associated therewith.

The voter's sign in packet is received at a server 420, e.g., a central server, such as a federal or state server, wherein the identity of the voter is authenticated 230, e.g., by comparing the biometric digitized signature provided 220 with a previously provided biometric digitized signature, e.g., from registration and/or a prior election. It is noted that the sign-in packet and following actions may be for regular voting, for provisional voting and/or for absentee voting. Authentication 230 may also include authenticating the voters PKI certificate, VID number and/or other voter information with information stored in the voter registration database.

Once voter sign-in is authenticated 230, an acknowledgment 232 thereof is provided, e.g., to a local server 430, 440, such as a state, county, municipal or other server, which server 430, 440 issues 234 a ballot packet. The acknowledgment may include the voter PKI information, VID number and/or other voter information. Preferably, the voter sign-in information submitted in the sign-in packet includes a VID number which includes information representing the jurisdiction in which the voter is eligible to vote, and the VID number is forwarded 232 with the acknowledgment to the local server. Preferably, the ballot of the ballot packet is generated for the appropriate jurisdiction and issued 234 from the jurisdiction represented by the VID number included in the acknowledgment 232.

When the ballot packet is issued 234 by a local server 430, 440, it is transmitted to the central server 420 wherein it is routed 236 to the voter's computer 410, via the Internet, for the voter to vote 250. In voting 250, the voter on his computer 410 casts his vote 252 on the ballot packet and when finished voting submits 254 the ballot packet to the server via the Internet. It is noted that the ballot packet includes one or more ballot screens of a format determined by the appropriate election office, and desirably appears on the display of the voter's computer 410 in format similar to that of a like ballot displayed at a voting kiosk, a voting machine, on a paper ballot or other voting means. The voted ballot packet submitted 254 is preferably in a standardized format so that all voted ballot packets received by the server have the sane or similar characteristics.

Where a central server 420 is utilized, the voted ballot packet submitted 254 by the voter is routed 256 to the appropriate local server 430, 440 for vote tabulation 300. E.g., a federal server 420 may route 256 ballot packets to state servers 430, and/or a state server 420 may route ballot packets to county servers 430. Where separate servers 430, 440 are utilized, e.g., in a state and in counties thereof, the ballot packet is distributed 312 to the server 430, 440 of the jurisdiction to which it pertains. E.g., a state server 430 may distribute 312 ballot packets to county or municipal servers 440.

Vote tabulation 300 includes, e.g., tabulating 310 the ballot packets for regular votes, tabulating 320 ballot packets for provisional votes, and/or tabulating 330 the ballot packets for absentee votes. Optionally, the ballot packets when submitted by a voter may include another biometric digitized signature that can again be authenticated by comparison with the digitized signature information stored in the database from previous registration and/or voting when the ballot packet is opened 316, 318.

Each of tabulating 310 the ballot packets for regular votes, tabulating 320 ballot packets for provisional votes, and tabulating 330 the ballots packets for absentee votes, comprises the following process. Each ballot packet is "unwrapped" 314 in that it is decrypted and is tested for integrity, such as by any one or more of parity or other error checking means. Preferably, unwrapping 314 includes testing each ballot packet to verify that it conforms to predetermined characteristics of a standard ballot packet, i.e. a ballot in which only selections among the provided voting selections have been made (e.g., votes cast only for candidates and questions listed on the ballot) without any write-in information or other deviation from the standard ballot.

Preferably, these test characteristics permit identification and separation of ballot packets including one or more write in votes from ballot packets not having any write-in information, preferably without opening the ballot packet and without compromising the anonymity of the vote. It is desirable to segregate ballots including write-in information for separate processing because the additional information therein could include a virus, Trojan horse or other destructive code, and segregation permits these ballots to be opened one at a time in isolation from all other ballots so that if a ballot contains destructive code, only that ballot can be damaged by any destructive code therein.

Ballots conforming to the predetermined standard ballot characteristics are opened and counted 316 and the votes cast therein are tabulated 310. Opening a ballot includes reading the decrypted voting information therein that represents the voting selections made by the voter in casting his vote 252. Ballots with write-in information are opened one at a time in isolation and counted 318, with the written-in information being read and also tabulated. Optionally, where a voted ballot packet includes an optional biometric digitized signature, that signature is authenticated by comparison with a reference database signature when the ballot is unwrapped 314 or opened 316, and prior to counting the vote. Ballot packets for absentee votes are opened and counted 314, 316 after the ballot has been authenticated as being a valid absentee ballot. Ballot packets for provisional votes are opened and counted 314, 316 only after the eligibility of the voter has been established by the election office and the ballot has been authenticated as being a valid provisional ballot.

In opening and counting 314, 316 ballots, the registration record in the registration database may be marked or flagged to indicate that a voter has voted and, if the voter record has previously been so marked or flagged, then the subsequent ballot may be deemed a duplicate and not be counted. Checking for plural voting at this time may be useful, e.g., where a voting machine (kiosk) is not connected to the server during the time for voting, and so a person could vote once via the Internet and once via such free-standing kiosk voting machine. A suspect ballot may be set aside for investigation leading to it being counted if determined not to be another vote by the same voter and/or to prosecution if it appears that voting fraud has been attempted. Attempts at voting fraud may also be detected in the manner described in U.S. patent application Ser. No. 10/127,787 entitled "VOTING FRAUD DETECTION SYSTEM AND METHOD" filed Apr. 22, 2002, by Kevin Kwong-Tai Chung, which application is hereby incorporated herein by reference in its entirety.

Figure 4:
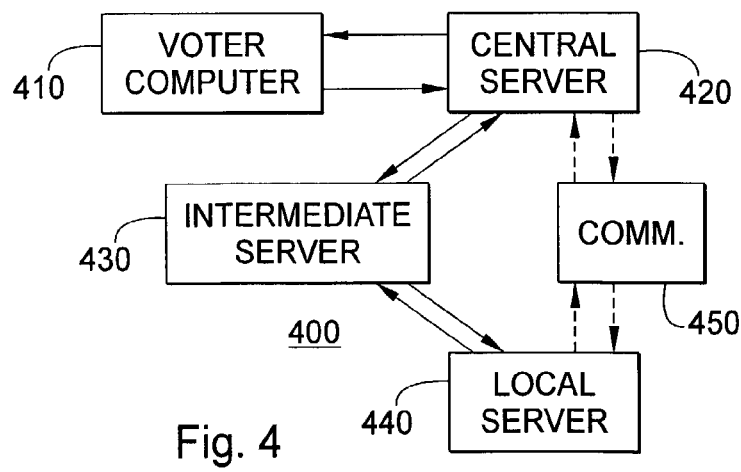
FIG. 4 is a schematic block diagram of an example voting system related to the example election process of FIGS. 1–3.

FIG. 4 is a schematic block diagram of an example voting system 400 related to the example election process of FIGS. 1–3. System 400 includes a computer 410 utilized by a person registering and/or conducting a transaction with a server 420 via the Internet. Central server 420 is in communication with intermediate server 430 which is in communication with local server 440, and/or server 420 is in communication with local server 440 via communication means 450. Typically each of servers 420, 430 and/or 440 is a server or a cluster of servers in one or more locations. Also typically, each of intermediate server 430 and local server 440 may represent plural servers and/or clusters of servers utilized by different political entities, such as states, provinces, counties, municipalities and the like. Communication means 450 illustrates an optional communication path(s) and/or route(s) that may be employed where no intermediate processor(s) 430 is employed.

The two-directional arrows between computer 410 and server 420, between servers 420 and 430 and between servers 430 and 440, and between means 450 and servers 420, 440, as well as communication means 450, represent communication paths which may include, for example, any one or more of the Internet, a local area network (LAN), a wide area network (WAN), another network and/or communication hub, telephone, wire, cable, optical fiber, radio and/or optical wireless communication, as well as other means of communication. As used herein, the shorthand term "via the Internet" may refer to communication over the Internet alone and/or to a communication path including the Internet and any one or more of the foregoing communication means. Communication among servers 420, 430 and/or 440 may be via a government-controlled network having appropriate security and other features for insuring the integrity of the voting information, process and result.

Computer 410 may be utilized for obtaining a PKI certificate, applying to vote, requesting an absentee ballot, voting, to receive and act on information packets and to submit information packets, to receive and check on the status of an application submitted, and/or to log on and sign in, including providing a biometric identifier such as a biometric digitized signature. For submitting a biometric digitized signature, an appropriate signature device is associated with computer 410 and the necessary software therefor is included in the information packet(s) provided via election server 420.

As above, central server 420 may be a federal or state server, and servers 430, 440 may be state, county, municipal and/or another local server, it being noted that local server 440 and/or intermediate server 430 may be optional. Any one or more or all of servers 420, 430, 440 may be referred to as "a server" or as "the server," e.g., where it the distinction is not deemed important, such as apart from describing FIG. 4.

Server 420, which may be a federal server, acts as a "postmaster" in directing, routing, and/or distributing information packets (e.g., registration packets, ballot packets, voted ballot packets) among computer 410 and servers 430, 440, as well as authenticating and/or verifying voter identity, biometric digitized identifier and/or ballot information. In addition, server 420 may attach a date-time stamp to each information packet processed, wherein the date-time stamp preferably includes the time to a very precise and fine division. Preferably, the time is specified to the millisecond. Optionally, the server time may be referenced to a national and/or international time standard, such as that maintained by the National Institute for Standards and Technology (NIST) in the United States.

Where intermediate and/or local servers 430, 440 operate with differing formats for, e.g., registration and/or election databases, ballot formats and the like, server 420 may serve as a conversion processor and/or compiler for providing registration packets and/or ballot packets in a standardized format and/or style, and/or for providing completed registration packets and/or voted ballot packets in the format(s) utilized by servers 430 and/or 440.

Optional intermediate server 430 may be, e.g., a state server, that acts as "postmaster" for directing, routing, and/or distributing information packets (e.g., registration packets, ballot packets, voted ballot packets) among plural local servers 440. Where server 430 is a state server 430, a centralized state registration database is preferably maintained thereon, registration packets are issued and completed registration packets are processed by server 430, and information from the registration database is communicated to central server 420 and/or to local servers 440 as needed. Optionally, server 430 may add a date-time stamp to each information packet produced and/or processed, in like manner to that described for server 420.

Local server 440 is typically controlled by the election office controlling voter registration, voting and/or elections. Server 440 may authorize or deny absentee and/or provisional voting and may generate and provide appropriate ballot packets therefor, and may also provide updating information to a central state registration database, e.g., on server 420 or 430. Server 440 may also generate ballots for use in voting at polling places and/or via the Internet for contests under its jurisdiction. Voted ballot packets are received at server(s) 440 where they are stored until being processed. Voted ballot packets are processed at server(s) 440, e.g., they are unwrapped, authenticated, opened, counted and tallied/tabulated. Alternatively and/or additionally, such processing may be performed at any one or more of servers 420, 430, 440, as may be required by the applicable election law or as may be desirable and/or convenient.

Figure 5:
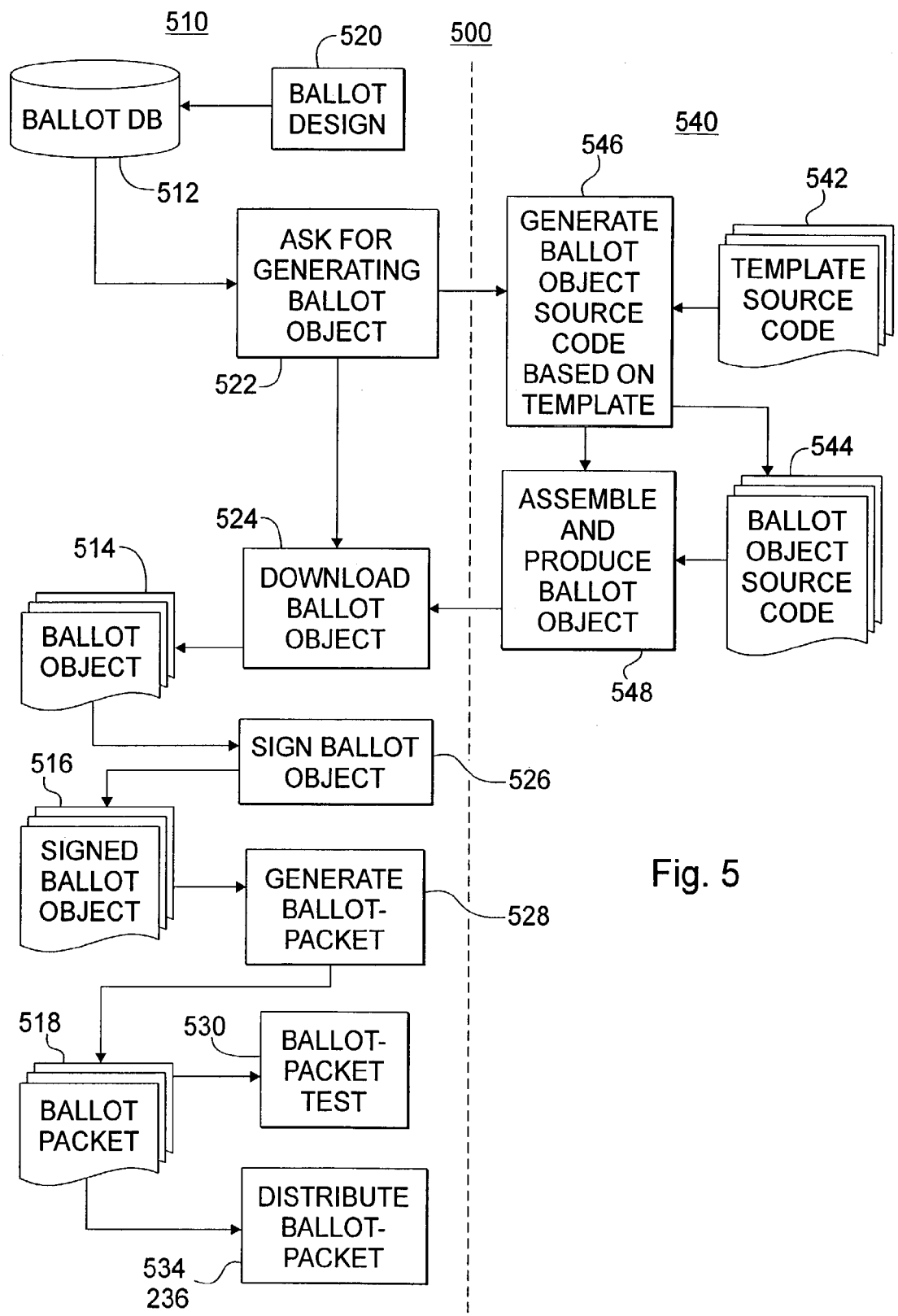
FIG. 5 is a schematic diagram representative of a ballot generation aspect of the example voting method and system of FIGS. 3 and 4.

FIG. 5 is a schematic flow diagram representative of a ballot generation 500 aspect of the example voting method and system of FIGS. 3 and 4. In FIG. 5 computer files are represented by symbols evocative of a cylinder (e.g., 512) and sheets of paper (e.g., 514, 516, etc.), and operations therein are typically performed by one or more of servers 420, 430, 440, or on a server or computer provided for ballot generation. Ballot packet generation 510 is represented to the left of the dashed vertical line (and typically may be performed by server 440) and ballot object generation 540 to the right of the dashed line (and typically may be performed by server 420).

A ballot is designed 520, e.g., is laid out in a desired format and/or style and contest information representative of one or more contests, candidates, public questions, referenda, constitutional amendments and/or matters to be voted on is entered, typically by an election office, and is stored in one or more files in a ballot database (DB) 512. Ballot generation may be run in a browser/client or client/server mode, in a format compatible with and/or convertible into the format of the ballot object generating process to be described. Preferably, the ballot is generated in a format that is compatible with the ballot object generating process and any voting machine to be utilized.

Generating a ballot object 540 is requested 522 when all ballot information has been entered and is performed by ballot object generating software that includes machine readable instructions that includes the ballot object template source code 542. Preferably, the ballot object generating software 540 cannot be accessed by the election official, but the data utilized for generating 546 the ballot object must come from the ballot information entered by an election official. The ballot template source code 542 is modified according to the ballot information to generate 546 ballot object source code based upon the template which is stored as ballot object source code 544, and a unique identifier is generated and assigned thereto and associated therewith to uniquely identify the particular ballot object 544 in the universe of all ballot objects, e.g., without regard to a particular election and/or jurisdiction. The ballot object source code 544 is assembled 548 to produce the ballot object. The assemble function and technology of the tool program, e.g., ActiveX Control developed with a Visual C++ tool, may be utilized directly or indirectly for assembling the ballot object.

The generated 546 and assembled 548 ballot object is downloaded 524 and is stored as a ballot object 514. Optionally, an election official may be required to sign 526 the ballot object before it is embedded into a web page, e.g., by signing with a digital identifier such as an alphanumeric identifier, and the signed ballot object 516 is stored. A ballot packet 518 is generated 528 from the ballot object 514 or signed ballot object 516, as the case may be, and stored. The ballot object 514, 516 may be embedded in a web page in generating 528 the ballot packet 518 which may also include JavaScript functions. Ballot packet 516 is tested 530, e.g., with function, data format and integrity tests to assure that it completely and accurately presents the voting selections a voter will have opportunity to select and completely and accurately accepts and records voting selections made by a voter. Ballot packet 518 may include, either as a standard packet and/or as a requested feature, voice assistance and/or large (expanded) size display for assisting visually impaired persons to vote, in similar manner to that described in relation to the voting apparatus and method of incorporated U.S. patent application Ser. No. 10/255,348.

The ballot packet 518 is then distributed 234, 236 responsive to voter's requests, e.g., requests in the form of submitted sign-in packet, via the Internet. Distribution (sending) and return (receiving) of a ballot packet to a voter via the Internet may be accomplished in various ways. For example, an HTML form with some JavaScript and/or XML support is one common approach, however, it may lack some functions desired for the ballot packet and it undesirably allows access to the ballot source code. A preferable approach is to utilize JavaApplet and/or ActiveX Control which can be embedded into the web page and downloaded automatically therewith. JavaApplet is compiled as Java bytecodes which are interpreted at runtime by a virtual machine; ActiveX Control is compiled and run as binary code, thereby providing a degree of security for the internal design, running logic and special data within ballot packet 518. In addition, JavaApplet and/or ActiveX Control can generate a voted ballot packet in standard HTML data format or a predetermined format and encrypt the voted ballot packet which includes all of the voter's voting selections for submission.

After a voter has downloaded a ballot packet 518, he utilizes it to vote locally, i.e. on the computer 410 to which ballot packet 518 was distributed 234, 236. In other words, there is no interaction between the voter's computer and the web server during voting. The voter's computer 410 may remain connected to the Internet or may be disconnected during the period between receiving a ballot packet sent 236 to the voter and submitting 254 a voted ballot packet. Preferably, the ballot packet 518 may be started only once when it is downloaded and cannot restart independently, so the voter's computer 410 cannot be turned off before the voted ballot packet is submitted 254.

Figure 6:
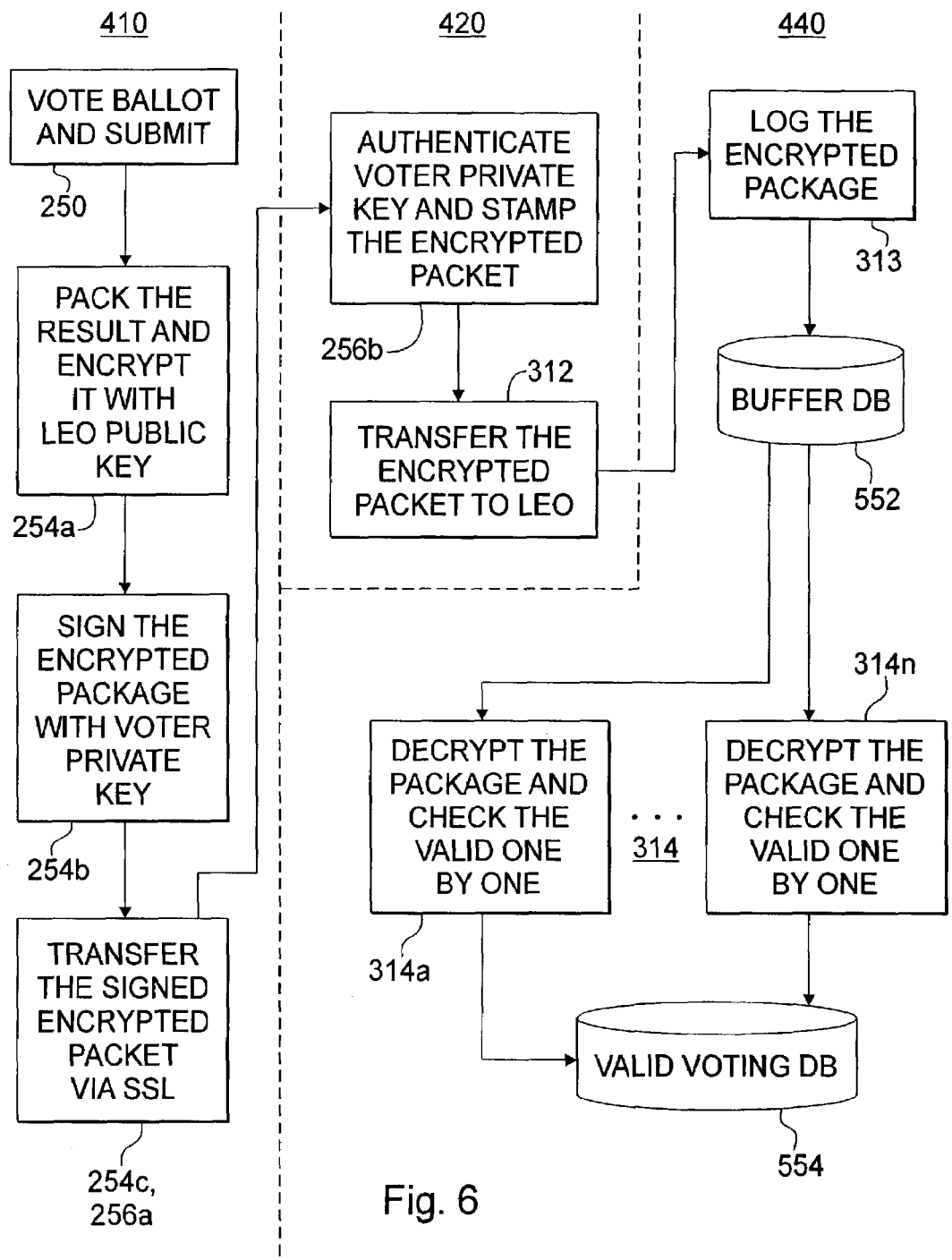
FIG. 6 is a schematic diagram representative of a vote tabulation aspect of the example voting method and system of FIGS. 3 and 4.

FIG. 6 is a schematic flow diagram representative of a vote tabulation aspect of the example voting method and system of FIGS. 3, 4 and 5. In FIG. 6 computer files are represented by symbols evocative of a cylinder (e.g., 552, 554), and operations typically performed by computer 410 and servers 420, 440 are separated by dashed lines.

Ballot packet 518 is voted and submitted 250 as a voted ballot packet by the voter. Specifically, the ballot and voting selections are packed and encrypted 254a with the PKI public key of the local election office (LEO) included in ballot packet 518. The packed and encrypted 254a ballot and voting selections are signed 254b with the voter's PKI private key and is submitted (transferred) 254c, 256a as a voted ballot packet, e.g., to server 420.

Server 420 authenticates 256b the voter PKI private key and, if authenticated, attaches a date-time stamp to the encrypted voted ballot packet and transfers 312 the voted ballot packet to the server, e.g., server 440 of the LEO or other vote counting and tabulating authority. The voted ballot packet is logged 313 and stored in a buffer database 552 as are all voted ballot packets, which may be received one at a time over a period of hours or days or weeks, depending upon the time period established for voting and/or the type of ballot. E.g., typically, even where regular voting is conducted on one day ("election day"), early voting may be permitted for one or more weeks in advance of the election day and absentee ballots may be received at any time during a period extending several weeks prior to the election day and perhaps for several days after the election day.

Voted ballot packets from database 552 are unwrapped 314 one at a time and are stored in a valid ballot database 554. I.e. a first voted ballot packet is decrypted 314a and checked for being a valid voted ballot, then a second is decrypted and checked, and an $N^{th}$ voted ballot is decrypted 314n and checked. Typically, unwrapping 314 is performed after the time for voting has closed and at least all regularly voted votes that are valid have been received, although ballot packets for absentee ballots may be later received and ballot packets for provisional ballots may be held back for later processing after the eligibility of the voter to vote has been verified. All voted ballots are counted 316, 318 and the voting result is tabulated 300.

Figure 7:
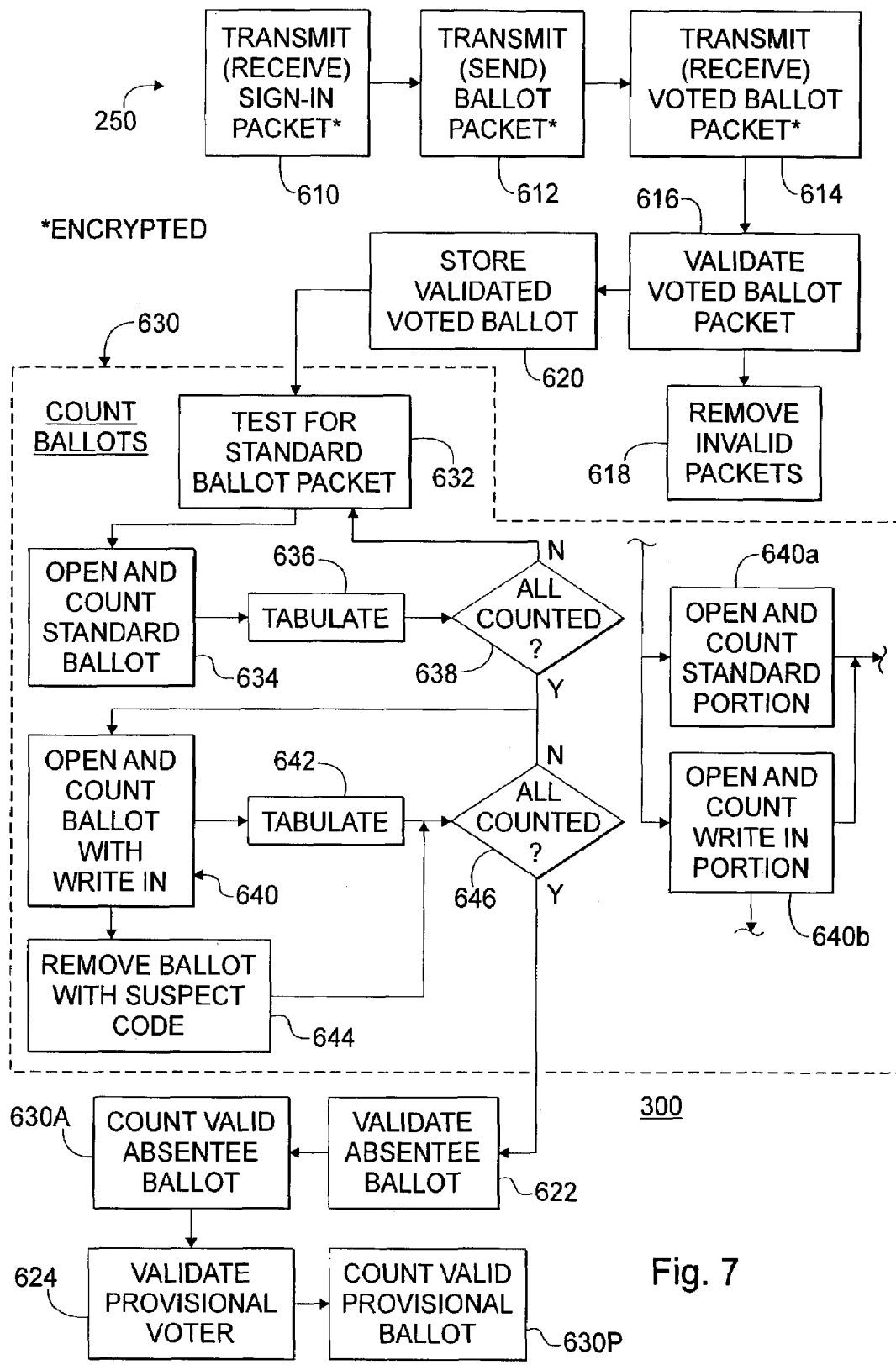
FIG. 7 is a schematic diagram representative of various security arrangements associated with the example voting method and system described.

FIG. 7 is a schematic flow diagram representative of various security arrangements associated with the example voting method and system described. Security is of substantial importance in Internet transactions, particularly in the context of an election where the integrity of voting and the election result has governmental and political implications. As the period over which voting in an election expands, e.g., from a period of hours on an "election day" to a period of weeks or months for absentee and advance voting and/or early voting, the time during which hackers, terrorists and others may attempt to cast improper votes, to corrupt the election, to inject a virus, Trojan horse or other destructive code, and/or otherwise attack the election server(s) and/or system, likewise increases. Any and all of the foregoing are referred to as "malicious code."

A transaction 250 is accomplished by the transmission of three separate information packets, e.g., via the Internet. Preferably, each information packet comprises a one-way transmission without interactive communication between the computer from which the transaction is made and the server processing the transaction. For example, a voting transaction 250 requires only transmitting 610 a sign-in packet from the computer to the server, transmitting 612 a ballot packet from the server to the computer if the sign-in packet is authenticated, and transmitting a voted ballot packet from the computer to the server.

The sign-in packet includes authentication information such as a biometric digitized signature and/or other biometric identifier, and each packet is preferably encrypted for transmission. The ballot packet represents the applicable specific ballot in electronic form and includes voting-specific operating software, i.e. the software needed to mark the ballot in voting and to transmit the voted ballot in a predetermined form, i.e. as a voted ballot packet. Once the voter has made his voting selections and indicates same, e.g., by clicking on a "Cast Vote" button, the voted ballot is wrapped in two envelopes, an inner and an outer envelope, of the voted ballot packet.

For example, the voted ballot is wrapped with the voter VID number in an "inner" envelope which is encrypted, e.g., utilizing MD5 128-bit encryption. The unmarked "inner" envelope is then encrypted using the voter's PKI identification, and optionally including a biometric digitized signature, thereby providing a marked "outer" envelope. When each information packet is transmitted, it is tagged with a time-date stamp by each server, e.g., the central server as well as any intermediate and/or local server, with the time recorded to a fine division, e.g., a millisecond.

When the voted ballot packet is "unwrapped" and/or opened, the marked outer packet is decrypted first and the identifying information therein, e.g., VID number, biometric signature and/or PKI identifier, may be read and processed for verifying eligibility to vote and/or authenticating the voter, as well as for testing the ballot packet for conformance to the parameters of a standard voted ballot packet. Specifically, MD5 encryption may be utilized to assure integrity between the VID number and the voted ballot, e.g., within the inner envelope, because any change to the information therein will be detected. With MD5 the relationship between the VID number and the voted ballot information is fixed and cannot be changed. Then the unmarked ballot packet, if valid, is stored for later opening and counting as described. Each information packet transmitted by one server to another may be tagged with a time-date stamp by each server, e.g., the central server as well as any local and/or intermediate server, with the time recorded to a fine division, e.g., a millisecond.

Because the sign-in packet, the ballot packet and at least the non-write in portion of the voted ballot packet are in predetermined form, there is no opportunity to insert malicious code therein. In addition to security benefitting from only a small number of transmissions, there is no definite or predictable time or other relationship between the transmissions of the information packets that could be used to facilitate identifying any one information packet with any other information packet.

Upon or after receipt at the server, the voted ballot packet is validated 616 and if valid is stored 620 as a validated ballot packet or is isolated 618 as an invalid ballot packet, typically being removed 618 as an invalid voted ballot packet. Validation may include, for example, testing the size and form of the packet against a standard size and form that all valid packets must have, verifying a PKI or other encryption characteristic, authenticating a biometric digitized signature and/or other biometric identifier, and/or comparing voter identifying information to information in a registration database. Invalid voted ballot packets may be discarded or may be retained, e.g., for investigation.

At the time and/or times for counting voted ballots, stored 620 validated voted ballots are counted and tabulated 630. Each packet is tested 632 for conformance to the predetermined standard voted ballot packet criteria and if a standard ballot, is opened and counted 634 and is tallied and/or tabulated 636. Because all of the possible combinations of information that can a voted ballot packet can contain is known, i.e every possible combination of voting selections is known, a standard voted ballot packet must conform to one of the possible combinations to be valid, unless a write-in vote is included. Testing may include comparing each voted ballot packet with all of the possible combinations, in which case each valid standard voted ballot packet will match one of the possible combinations, and all others are non-standard, e.g., contain a write-in.

If all ballots have not been counted 638, path "N" is followed to the test 638 and the cycle 632–638 repeats until all ballots have been counted. This typically results in all ballots being counted except those including a write-in vote, e.g., typically greater than 95% of the valid voted ballot packets received (ballots cast) and more typically more than 99% of the valid voted ballot packets received (ballots cast). Because there is no opportunity for added code in the valid standard voted ballot packet, no malicious code can be inserted therein, e.g., as to gain access to the server thereby.

After all valid standard voted ballot packets are counted 634 and tabulated, decision 638 follows path "Y" for opening and counting 640 and tabulating 642 the valid voted ballot packets including one or more write-in votes. If an opened 640 ballot packet includes code that is considered suspect code, i.e. code suspected of being malicious code, that ballot is removed 644, e.g., for later investigation. If all ballots have not been counted 646, path "N" is followed to opening 640 and the cycle 640–644 repeats until all ballots have been counted. When all the ballots are determined 646 to have been counted, path "Y" is followed.

Because voted ballot packets including write-in information are opened separately and one at a time, each can be tested for the presence of malicious code. Any malicious code therein can contaminate only that vote, and not any other vote, whether prior or later opened and counted. To further reduce the potential effect of malicious code, counting/tabulating 630 preferably includes separately processing the non-write-in and the write-in portions of voted ballot packets containing write-in information. For example, opening and counting 640 preferably includes for each voted ballot packet containing write-in information, separately opening and counting 640a the standard portion thereof and also separately opening and counting 640b the write in portion thereof.

Further, each write-in portion may be opened and counted separately form each other write in portion, thereby to prevent malicious code spread among two or more write-in portions from acting together. In addition, any attempt to submit malicious code is further limited by limiting the number of characters that can be submitted in any write-in portion, e.g., limiting the field to 16 characters. Still further, any attempt to submit malicious code is further limited by limiting the type of characters that can be submitted in any write-in portion, e.g., limiting the field to ASCII characters. Each write-in selection is limited as to both number and type of characters that may be entered, e.g., each write-in selection is typically limited to 32 or fewer ASCII characters, and preferably to 16 ASCII characters.

The one at a time processing of voted ballot packets may be performed on one computer and/or server, or may be performed on a group or cluster of computers or servers for fasted processing by utilizing parallel processing. In each case, each processor performs the complete operation 630 on one ballot packet and verifies that it has not been infected and/or affected by malicious code therefrom, prior to requesting another voted ballot packet for processing, e.g., from a load-balancing server where a cluster thereof are utilized. In addition, each voted ballot packet is preferably copied and stored an archive server for purposes of disaster recovery should any fault or failure, including infection by a malicious code, affect the operating server(s). In the event thereof, the stored voted ballot packets are available for use in investigating the source of malicious code, e.g., assisted by the date-time stamping each voted ballot packet receives from each server that handles it.

Voter registering and updating of registration information are two activities in which the user (the person registering or updating registration) may provide substantial information that is written in on a registration and/or registration update format. Election security may be provided against malicious code submitted in a voter registration and/or registration update by the separately processing each registration and/or update in like manner to that described above.

Alternative ways to increase resistance to malicious code during an election include separating the registration processing from the election processing, e.g., by utilizing separate servers and/or by temporal separation, e.g., by ceasing to process registrations and updates during the time period when voting is conducted. This generally is not disruptive because all voters eligible to vote in a particular election typically must be registered prior to an election. Thus, the registration database is "closed" to new entries and is utilized for verifying eligibility to vote and for authenticating voters until the election is completed. Registration applications and updates received during the time registration is closed may be stored and processed after the election is completed, and the same server(s) may be utilized for registration and voting/election processing.

Typically, regular voted ballot packets are counted first 630, and then absentee ballots are validated 622 and counted/tabulated 630A and/or provisional voted ballot packets are validated 624 and counted/tabulated 630P. Regular voted ballot packets, absentee voted ballot packets and/or provisional voted ballot packets may be counted in any order, whether separately or mixed together, as may be required, convenient and/or desirable.

Accordingly, it is seen that plural levels of security is provided for completely and accurately counting the vote and for excluding and/or severely limiting the damage that may be done by any malicious code that may be submitted. In summary, these levels include a limited number (e.g., three) of information packets transmitted, standardized information packet size and/or form, one-way communication of information packets (rather than interactive communication), biometric authentication, PKI and/or other encryption, validating packets and removing invalid packets, separately processing standard ballots and write-in ballots, opening write-in information one at a time, limiting the number and types of characters that may be written in, and/or separating and/or ceasing to process registrations during the time period when voting is conducted.

Thus it can be said that this approach seeks not only to limit the opportunities for malicious code to be inserted, but also to limit the code that can be inserted, e.g., by limiting the number and types of characters, thereby seeking to contain the threat and limit the damage it may cause, rather than to do the impossible of eliminating it.

The present invention can be embodied as a computer implemented process or processes and/or apparatus for performing such computer-implemented process or processes, and can also be embodied in the form of a tangible storage medium containing a computer program or other machine-readable instructions (herein "computer program"), wherein when the computer program is loaded into a computer or other processor (herein "computer") and/or is executed by the computer, the computer becomes an apparatus for practicing the invention. Storage media for containing such computer program include, for example, floppy disks and diskettes, compact disks (CD)-ROMs (whether or not writeable), DVD digital disks, RAM and ROM memories, computer hard drives and back-up drives, and any other storage medium readable by a computer. The invention can also be embodied in the form of a computer program, e.g., whether stored in a storage medium or transmitted over a transmission medium such as electrical conductors, fiber optics or other light conductors, or by electromagnetic radiation, wherein when the computer program is loaded into a computer and/or is executed by the computer, the computer becomes an apparatus for practicing the invention. The invention may be implemented on a general purpose microprocessor or on a digital processor specifically configured to practice the invention. When a general-purpose microprocessor is employed, the computer program code configures the circuitry of the microprocessor to create specific logic circuit arrangements.

It is noted that while the voter identifier ("VID") and other identifiers and parameters is/are referred to as "numbers," each may include numerical, alphabetic, alpha-numeric and other characters and symbols, conventional or arbitrary, as may be desired. Information is typically represented and/or stored in a memory in accordance with a predetermined formula or algorithm or other scheme, either on a character by character basis or on the basis of one or more combinations of the characters or values, for example, binary, binary coded decimal, hexadecimal, or any other digital coding representation thereof. The parity or check number or code is likewise representative of the information represented or stored in the memory in accordance with a predetermined formula or algorithm or other scheme, either on a character by character basis or on the basis of one or more combinations of the characters or values stored in the memory. Suitable formula and algorithms therefor include, for example, binary, binary coded decimal, other digital coding representations thereof, parity checks or other parity representations, sum checks, field relationship checks or any other predetermined relationship between the stored data or information and the parity or check number or code.

While the present invention has been described in terms of the foregoing exemplary embodiments, variations within the scope and spirit of the present invention as defined by the claims following will be apparent to those skilled in the art. For example, because the biometric digitized signature is a powerful and reliable means for authenticating the identity of a person seeking to vote, the system and method herein may provide to a voter his VID number (which is retrieved from the voter registration database) once his identity has been authenticated by comparison of biometric digitized signature or another biometric identifier.

It is noted that the method and system described herein is complementary to and compatible with other voting apparatus such as DRE voting machines and/or paper ballots, whether hand marked or read electrically, optically and/or mechanically. A DRE machine such as that described in incorporated U.S. patent application Ser. No. 10/255,348, and/or an optically scanned ballot system such as that described in U.S. patent application Ser. No. 10/260,167 entitled "ELECTRONIC VOTING APPARATUS AND METHOD FOR OPTICALLY SCANNED BALLOT" filed Sep. 30, 2002, which is hereby incorporated herein by reference in its entirety, for example, may be coupled into the same system with the Internet voting arrangement described.

In addition, additional privacy protection may be provided by utilizing separated servers and/or other processors for unwrapping and authenticating voted ballot packets. For example, a first (e.g., central) server which lacks any software for opening and/or counting voted ballots may unwrap the marked envelope and authenticate the voted ballot packet from the information of the marked envelope, and then forward only the unmarked voted ballot packet (e.g., in its unmarked envelope) to another (e.g., local) server, i.e. without identifying information so as to ensure voter privacy and vote confidentiality. In such case, the first server will store the voter identifying information in a randomized file which is provided to the second server. Further, election official access may require concerted action by plural election officials each having their own log-on identifier and password, and/or biometric digitized signature, to avoid an individual attempt to tamper with the vote.

Further, the Internet voting method and system described may be utilized for one form of voting, e.g., absentee voting and/or early voting, where other voting is conducted with conventional DRE machines, optically-read ballots and the like.

References to a server and/or a computer are not limited to one apparatus in a particular location, but may include plural apparatus in one or plural locations. A server may refer to a single server or to many servers, and/or may refer to a server communicating via any means for communicating, including but not limited to a wire, cable, telephone, optical fiber, optical communication device, radio or other wireless device, local area network, wide area network, Ethernet and/or other network, an Intranet, and/or the Internet. Similarly, references to a central computer, intermediate computer, local computer and/or other computer may include one or more computers in one or plural locations.

While the invention herein is described in the context and terms of Internet voting, the invention may be employed in other electronic transactions including but not limited to electronic commercial transactions ("e-commerce"), electronic governmental transactions ("e-government"), and the like. In such cases, the "voter" is representative of a purchaser, seller, party or other user, "voting" is representative of purchasing, selling, participating and the like, and the "voter registration database" is representative of a database of registered purchasers, sellers, parties and/or other users.

Further, while plural biometric digitized signatures, PKI security keys, identifiers and/or other security features may be desirable in the context of a transaction wherein a very high level of identification and/or authentication is desired, such as in governmental voting, lesser levels of identification may be acceptable in other transactions, such as low value purchases, opinion surveys and the like conducted via the Internet. An example of the latter may include a single biometric digitized signature and normal Internet encryption techniques.

What is claimed is:

1. A method for conducting a transaction via the Internet comprising:

transmitting via the Internet a first information packet including a dynamic biometric digitized signature;

processing the dynamic biometric digitized signature for authenticating the first information packet;

if the first information packet is authenticated, transmitting a second information packet via the Internet, the second information packet including machine readable instructions for enabling transaction information including selectable predetermined transaction information to be entered and transmitted in a predetermined format in a third information packet, wherein the predetermined format includes a combination of predetermined transaction information selected from the selectable predetermined transaction information;

transmitting via the Internet the third information packet including transaction information entered therein;

whereby the third information packet includes a combination of predetermined transaction information selected from among the selectable predetermined transaction information, validating the third information packet as relating to the second information packet;

if the third information packet is validated:

if the transaction information is in the predetermined format, processing the transaction information of the third information packet that includes a known possible combination of predetermined transaction information selected from the selectable predetermined transaction information of the predetermined format for conducting a transaction; and if the transaction information includes information not in the predetermined format, testing the information not in the predetermined format for malicious code, and, if not including malicious code, processing the information not in the predetermined format for conducting the transaction.

2. The method of claim 1 wherein the transaction includes voting and the transaction information includes voting selections, and wherein the transaction information in the predetermined format represents voting selections selected from among predetermined voting selections of a ballot transmitted in the second information packet, and wherein the information not in the predetermined format represents write-in voting selections.

3. The method of claim 1 wherein:

the transaction includes registering and the transaction information includes registration information relating to a person registering; and/or the transaction includes voting and the transaction information includes voting selections.

4. The method of claim 3 wherein the dynamic biometric digitized signature represents the person registering and/or a person voting.

5. The method of claim 1 wherein said processing the dynamic biometric digitized signature for authenticating the first information packet includes comparing the dynamic biometric digitized signature with a database of registered dynamic biometric digitized signatures.

6. The method of claim 1 wherein each second information packet further includes a unique identifier, and wherein said validating the third information packet as relating to the second information packet includes comparing an identifier included in the third information packet with a database of unique identifiers included in second information packets.

7. The method of claim 1 further comprising:

providing in the first, second and/or third information packets a PKI key of a sender thereof, and/or encrypting one or more of the first, second and third information packets.

8. A method for conducting a voting transaction via the Internet comprising:

transmitting via the Internet a sign-in information packet including a dynamic biometric digitized signature of a person voting;

processing the dynamic biometric digitized signature of the sign-in information packet for authenticating the person voting;

if the sign-in information packet is authenticated, transmitting a ballot information packet via the Internet, the ballot information packet including machine-readable instructions for enabling voting selection information to be entered and transmitted in a predetermined format in a voted ballot information packet, wherein the voting selection information may include a selection from among predetermined selections and/or a write-in selection;

transmitting via the Internet the voted ballot information packet including voting selection information entered therein;

testing the voted ballot information packet for voting selection information representing a write-in selection; and for voting selection information selected from among predetermined selections, counting the voting selection information of thethird information packet selected from among predetermined selections;

for voting selection information including a write-in selection, testing the write-in selection for malicious code, and, if not including malicious code, counting the write-in voting selection.

9. The method of claim 8 wherein each write in selection is limited to a predetermined number of characters and/or is limited to ASCII characters.

10. The method of claim 8 wherein voting selection information including a write-in selection is processed separately from and/or subsequently to voting selection information selected from among predetermined selections.

11. The method of claim 8 wherein the steps of claim 8 are repeated for conducting a plurality of voting transactions, and wherein each voting selection information including a write-in selection is processed separately from each other voting selection information including a write-in selection.

12. The method of claim 8 wherein said processing the dynamic biometric digitized signature for authenticating the person voting includes comparing the dynamic biometric digitized signature thereof with a database of dynamic biometric digitized signatures of registered voters.

13. The method of claim 8 wherein each ballot information packet further includes a voter identifier, the method further comprising validating the voted ballot information packet as relating to the second information packet by comparing a voter identifier included in the voted ballot information packet with a database of voter identifiers included in ballot information packets.

14. A method for conducting a plurality of voting transactions in an election, at least a portion of the voting transactions being conducted via the Internet, comprising:

transmitting via the Internet a request for a ballot, the request for a ballot including voter identifying information and a biometric identifier in an information packet;

authenticating the request for a ballot by authenticating the biometric identifier as corresponding to a voter;

if the request for a ballot is authenticated, transmitting via the Internet a ballot information packet including a ballot and a voter identifier corresponding to the voter, the ballot for selecting among predetermined voting selections and for making write-in voting selections;

transmitting via the Internet a voted ballot information packet including the voter identifier corresponding to the voter and voting selections selected from among the predetermined voting selections and/or write-in voting selections;

whereby the voted ballot information packet includes, in addition to the identifier, a combination of voting selections selected from among the predetermined voting selections and optionally includes one or more write-in voting selections, validating the voted ballot information packet by comparing the voter identifier therein with voter identifiers included in ballot information packets; and if validated, and if the combination of voting selections thereof selected from among the predetermined voting selections are a known possible combination of the predetermined voting selections, then opening the voted ballot information packet and counting the voting selections therein that are of the combination of voting selections selected from among the predetermined voting selections; and if validated, and if including a write-in voting selection, testing the write-in voting selection for malicious code, and, if not including malicious code, counting the write-in voting selection.

15. The method of claim 14 further comprising registering voters, wherein registering voters comprises:
transmitting via the Internet a registration application including voter identifying information and a voter biometric identifier;
storing in a registration database the voter identifying information and the voter biometric identifier; and
acknowledging via the Internet the registering of the voter.

16. The method of claim 15 wherein said authenticating the request for a ballot by authenticating the biometric identifier as corresponding to a voter includes comparing the biometric identifier thereof with the voter biometric identifier stored in the registration database.

17. The method of claim 15 wherein said acknowledging includes generating a voter identifier for the voter, and wherein the generated voter identifier is included in the ballot information packet as the voter identifier corresponding to the voter.

18. The method of claim 14 wherein the voted ballot information packets include regular voted ballot information packets, provisionally voted ballot information packets and/or absentee voted ballot information packets, and wherein regular voted ballot information packets, provisionally voted ballot information packets and/or absentee voted ballot information packets are validated by said validating and thereafter separately undergo said opening and counting.

19. The method of claim 14 wherein said opening and counting step for voted ballot information packets including only voting selections selected from among the predetermined voting selections is performed separately from said opening and counting step for voted ballot information packets including write-in voting selections.

20. A method for conducting a plurality of voting transactions in an election, at least a portion of the voting transactions being conducted via the Internet comprising:

transmitting via the Internet a request for a ballot, the request for a ballot including voter authenticating information in one information packet;

authenticating the request for a ballot by authenticating the voter authenticating information therein as corresponding to a voter;

if the request for a ballot is authenticated, transmitting via the Internet one ballot information packet including a ballot and an identifier, the ballot for selecting among predetermined voting selections and for making write-in voting selections;

transmitting via the Internet one voted ballot information packet including the identifier and voting selections selected from among the predetermined voting selections and/or write-in voting selections;

whereby the voted ballot information packet includes, in addition to the identifier, a combination of voting selections selected from among the predetermined voting selections and optionally includes one or more write-in voting selections, validating the voted ballot information packet by comparing the identifier therein with identifiers included in ballot information packets; and if validated, and if the combination of voting selections thereof selected from among the predetermined voting selections are a known possible combination of the predetermined voting selections, then opening the voted ballot information packet and counting the voting selections therein that are of the combination of voting selections selected from among the predetermined voting selections; and if validated, and if including a write-in voting selection, testing the write-in voting selection for malicious code, and, if not including malicious code, counting the write-in voting selection.

21. The method of claim 20 wherein the voter authenticating information includes one or more of a symmetric key, an asymmetric key, a public key, a private key, a biometric identifier, and/or a biometric digitized signature.

22. The method of claim 20 further comprising registering voters, wherein registering voters comprises:
transmitting via the Internet a registration application including voter identifying information and a voter identifier;
storing in a registration database the voter identifying information and the voter identifier; and
acknowledging via the Internet the registering of the voter.

23. The method of claim 22 wherein the voter identifier includes one or more of a symmetric key, an asymmetric key, a public key, a private key, a biometric identifier, and/or a biometric digitized signature.

24. The method of claim 22 wherein said authenticating the request for a ballot by authenticating the voter authenticating information as corresponding to a voter includes comparing the voter authenticating information thereof with the voter identifier stored in the registration database.

25. The method of claim 22 wherein said acknowledging includes generating a voter identifier for the voter, and wherein the generated voter identifier is included in the ballot information packet.

26. The method of claim 20 wherein the voted ballot information packets include regular voted ballot information packets, provisionally voted ballot information packets and/or absentee voted ballot information packets, and wherein regular voted ballot information packets, provisionally voted ballot information packets and/or absentee voted ballot information packets are validated by said validating and thereafter separately undergo said opening and counting.

27. The method of claim 20 wherein said opening the voted ballot information packet and counting step for voted ballot information packets including only voting selections selected from among the predetermined voting selections is performed separately from said opening the voted ballot information packet and counting step for voted ballot information packets including write-in voting selections.

28. The method of claim 20 wherein the write-in voting selection is limited as to both number and type of characters that may be entered.

29. A method for conducting a plurality of voting transactions in an election, at least a portion of the voting transactions being conducted via the Internet, comprising:
   transmitting via the Internet a request for a ballot, the request for a ballot including voter identifying information in an information packet;
   authenticating the request for a ballot as corresponding to a voter;
   if the request for a ballot is authenticated, transmitting via the Internet a ballot information packet including a ballot and an identifier, the ballot for selecting among predetermined voting selections and for making write-in voting selections, wherein each write-in selection is limited as to both number and type of characters that may be entered;
   transmitting via the Internet a voted ballot Information packet including the identifier and voting selections selected from among the predetermined voting selections and/or write-in voting selections;
   whereby the voted ballot information packet includes, in addition to the identifier, a combination of voting selections selected from among the predetermined voting selections and optionally includes one or more write-in voting selections,
   validating the voted ballot information packet by comparing the identifier therein with identifiers included in ballot information packets; and
   if validated, and if the combination of voting selections thereof selected from among the predetermined voting selections are a known possible combination of the predetermined voting selections, then opening the voted ballot information packet and counting the voting selections therein that are of the combination of voting selections selected from among the predetermined voting selections, and if including write-in voting selections, testing each write-in voting selection for malicious code.

30. The method of claim 29 wherein the write-in selections are limited to 32 or fewer ASCII characters.

31. The method of claim 29 wherein the voted ballot information packets include regular voted ballot information packets, provisionally voted ballot information packets and/or absentee voted ballot information packets, and wherein regular voted ballot information packets, provisionally voted ballot information packets and/or absentee voted ballot information packets are validated by said validating and thereafter separately undergo said opening the voted ballot information packet and counting the voting selections therein.

32. The method of claim 29 wherein said opening the voted ballot information packet and counting step for voted ballot information packets including only voting selections selected from among the predetermined voting selections is performed separately from said opening the voted ballot information packet and counting step for voted ballot information packets including write-in voting selections.

33. The method of claim 32 wherein said opening the voted ballot information packet and counting step for voted ballot information packets including write-in voting selections is performed separately for each write-in voting selection.

34. The method of claim 29 further comprising registering voters, wherein registering voters comprises:
   transmitting via the Internet a registration application including voter identifying information;
   storing in a registration database the voter identifying information; and
   acknowledging via the Internet the registering of the voter.

35. The method of claim 34 wherein said acknowledging includes generating an identifier for the voter, and wherein the generated identifier is included in the ballot information packet as the identifier thereof.

36. A method for conducting a plurality of voting transactions in an election, at least a portion of the voting transactions being conducted via the Internet, comprising:
   transmitting via the Internet a request for a ballot, the request for a ballot including voter identifying information in an information packet;
   authenticating the request for a ballot by authenticating the voter identifying information as corresponding to a voter;
   if the request for a ballot is authenticated, transmitting via the Internet a ballot information packet including a ballot and an identifier, the ballot for selecting among predetermined voting selections and for making write-in voting selections;
   transmitting via the Internet a voted ballot information packet including the identifier and voting selections selected from among the predetermined voting selections and/or write-in voting selections;
   validating the voted ballot information packet by comparing the identifier therein with identifiers included in ballot information packets;
   opening the validated voted ballot packet and separating any write-in voting selections thereof from voting selections thereof selected from among the predetermined voting selections;
   counting the voting selections selected from among the predetermined voting selections; and
   separately opening and counting any write-in voting selection including testing each write-in voting selection for malicious code.

37. The method of claim 36 wherein said opening the validated voted ballot packet and separating any write-in voting selections thereof from voting selections thereof selected from among the predetermined voting selections comprises:
   separating any voted ballot packet having a write-in voting selection therein from voted ballot packets having only voting selections thereof selected from among the predetermined voting selections,
   opening the voted ballot packets having only voting selections selected from among the predetermined voting selections; and
   for any voted ballot packet having a write-in voting selection therein, separating the write-in voting selection from the voting selections thereof selected from among the predetermined voting selections.

38. The method of claim 36 wherein each write-in voting selection is limited as to both number and type of characters that may be entered.

39. The method of claim 38 wherein each write-in voting selection is limited to 32 ASCII characters.

40. The method of claim 36 wherein the voted ballot information packets include regular voted ballot information packets, provisionally voted ballot information packets and/or absentee voted ballot information packets, and wherein regular voted ballot information packets, provisionally voted ballot information packets and/or absentee voted ballot information packets are validated by said validating and thereafter separately undergo said opening and separating, said counting, and said separately opening and counting.

41. A storage medium encoded with machine-readable computer instructions for conducting a transaction via the Internet comprising:
   means for causing a computer to receive via the Internet a first information packet including an authenticating identifier;
   means for causing a computer to process the authenticating identifier for authenticating the first information packet;
   means for causing a computer to transmit a second information packet via the Internet if the first information packet is authenticated, the second information packet including machine readable instructions for enabling transaction information including selectable predetermined transaction information to be entered and transmitted in a predetermined format in a third information packet, wherein the predetermined format includes a combination of predetermined transaction information selected from the selectable predetermined transaction information;
   means for causing a computer to receive via the Internet the third information packet including transaction Information entered therein;
   whereby the third information packet includes a combination of predetermined transaction information selected from among the selectable predetermined transaction information,
   means for causing a computer to validate the third information packet as relating to the second information packet; and
   if the third information packet is validated:
   means for causing a computer to process the transaction information of the third information packet that includes a known possible combination of predetermined transaction information selected from the selectable predetermined transaction information of the predetermined format for conducting a transaction; and
   means for causing a computer to test information of the third information packet that is not a known possible combination of predetermined transaction information for malicious code.

42. The storage medium of claim 41 wherein said means for causing the computer to process the authenticating identifier for authenticating the first information packet includes means for causing the computer to compare the authenticating identifier with a database of registered authenticating identifiers.

43. The storage medium of claim 41 wherein each second information packet further includes a unique identifier, and wherein said means for causing the computer to validate the third information packet as relating to the second information packet includes means for causing the computer to compare an identifier included in the third information packet with a database of unique identifiers included in second information packets.

44. The storage medium of claim 41 wherein the authenticating identifier includes one or more of a symmetric key, an asymmetric key, a public key, a private key, a biometric identifier, and/or a biometric digitized signature.

45. A storage medium encoded with machine-readable computer instructions for conducting a plurality of voting transactions in an election, at least a portion of the voting transactions being conducted via the Internet comprising:
   means for causing the computer to receive via the Internet a request for a ballot, the request for a ballot including voter identifying information and an authenticating identifier in an information packet;
   means for causing the computer to authenticate the request for a ballot by authenticating the authenticating identifier as corresponding to a voter;
   means for causing the computer to transmit via the Internet a ballot information packet including a ballot and a voter identifier corresponding to the voter if the request for a ballot is authenticated, the ballot for selecting among predetermined voting selections and for making write-in voting selections;
   means for causing the computer to transmit via the Internet a voted ballot information packet including the voter identifier corresponding to the voter and voting selections selected from among the predetermined voting selections and/or write-in voting selections;
   whereby the voted ballot information packet includes, in addition to the identifier, a combination of voting selections selected from among the predetermined voting selections and optionally includes one or more write-in voting selections,
   means for causing the computer to validate the voted ballot information packet by comparing the voter identifier therein with voter identifiers included in ballot information packets; and
   means for causing the computer to open the validated voted ballot information packet and count the voting selections therein that are a known possible combination of voting selections selected from among the predetermined voting selections; and
   means for causing the computer to test write-in voting selections for malicious code.

46. The storage medium of claim 45 further comprising means for causing the computer to register voters, wherein registering voters comprises:
   means for causing the computer to receive via the Internet a registration application including voter identifying information and a voter authenticating identifier;
   means for causing the computer to store in a registration database the voter identifying information and the voter authenticating identifier; and
   means for causing the computer to acknowledge via the Internet the registering of the voter.

47. The storage medium of claim 46 wherein said means for causing the computer to authenticate the request for a ballot by authenticating the authenticating identifier as corresponding to a voter includes means for causing the computer to compare the authenticating identifier thereof with the voter authenticating identifier stored in the registration database.

48. The storage medium of claim 46 wherein said means for causing the computer to acknowledge includes generating a voter identifier for the voter, and wherein the generated voter identifier is included in the ballot information packet as the voter identifier corresponding to the voter.

49. The storage medium of claim 46 wherein the voter authenticating identifier includes one or more of a symmetric key, an asymmetric key, a public key, a private key, a biometric identifier, and/or a biometric digitized signature.

50. The storage medium of claim 48 wherein the authenticating identifier includes one or more of a symmetric key, an asymmetric key, a public key, a private key, a biometric identifier, and/or a biometric digitized signature.

51. The storage medium of claim 45 wherein the voted ballot information packets include regular voted ballot information packets, provisionally voted ballot information packets and/or absentee voted ballot information packets, and wherein regular voted ballot information packets, provisionally voted ballot information packets and/or absentee voted ballot information packets are validated by said means for causing the computer to validate and thereafter separately undergo said means for causing the computer to open and count.

52. The storage medium of claim 45 wherein said means for causing the computer to open and count step for voted ballot information packets including only voting selections selected from among the predetermined voting selections is performed separately from said means for causing the computer to open and count step for voted ballot information packets including write-in voting selections.

53. A method for conducting a voting transaction via the Internet, comprising:
   receiving via the Internet an information packet for requesting a ballot, the request for a ballot including a voter identifier;
   authenticating the request for a ballot by authenticating the voter identifier as corresponding to a voter;
   if the request for a ballot is authenticated, transmitting via the Internet a ballot information packet including a ballot and a ballot identifier, the ballot for selecting among predetermined voting selections and for making write-in voting selections;
   receiving via the Internet a voted ballot information packet including the ballot identifier and a combination of voting selections selected from among the predetermined voting selections and optionally write-in voting selections;
   validating the voted ballot information packet by comparing the ballot identifier therein with ballot identifiers included in ballot information packets;
   separating any write-in voting selections of the validated voted ballot information packet from the combination of voting selections thereof selected from among the predetermined voting selections;
   counting the voting selections of the combination of voting selections selected from among the predetermined voting selections; and
   separately opening and counting any write-in voting selection including testing the write-in voting selection for malicious code.

54. The method of claim 53 wherein said separating any write-in voting selections from the combination of voting selections selected from among the predetermined voting selections comprises:
   separating any voted ballot information packet having a write-in voting selection therein from voted ballot information packets having only voting selections thereof selected from among the predetermined voting selections,
   opening the voted ballot information packets having only voting selections selected from among the predetermined voting selections; and
   for any voted ballot information packet having a write-in voting selection therein, separating the write-in voting selection from the voting selections thereof selected from among the predetermined voting selections.

55. The method of claim 53 wherein each write-in voting selection is limited as to both number and type of characters that may be entered.

56. The method of claim 53 wherein each write-in voting selection is limited to 32 ASCII characters.

57. A method for conducting a voting transaction via the Internet, comprising:
   receiving via the Internet an information packet for requesting a ballot, the request for a ballot including a voter identifier;
   authenticating the request for a ballot by authenticating the voter identifier as corresponding to a voter;
   if the request for a ballot is authenticated, transmitting via the Internet a ballot information packet including a ballot and a ballot identifier, the ballot including selectable predetermined voting selections;
   receiving via the Internet a voted ballot information packet including the ballot identifier and voting selections including a combination of voting selections selected from among the selectable predetermined voting selections;
   validating the voted ballot information packet by comparing the ballot identifier therein with ballot identifiers included in ballot information packets;
   if the voted ballot information packet is validated, comparing the selected combination of voting selections with possible combinations of the selectable predetermined voting selections; and
   if the selected combination of voting selections matches one of the possible combinations of selectable predetermined voting selections, then counting the voting selections of the selected combination of voting selections;
   the method further comprising any one or more of:
   if the selected combination of voting selections does not match one of the possible combinations of selectable predetermined voting selections, then testing for malicious code before counting the voting selections of the selected combination of voting selections; and
   if the voted ballot information packet includes voting selections not matching any of the selectable predetermined voting selections, then testing for malicious code before counting the voting selections not matching any of the selectable predetermined voting selections.

* * * * *